United States Patent [19]

Hertrich

[11] 4,260,914

[45] Apr. 7, 1981

[54] DIFFERENTIAL LINEAR VELOCITY TRANSDUCER

[75] Inventor: Friedrich R. Hertrich, Boulder, Colo.

[73] Assignee: Digital Equipment Corporation, Maynard, Mass.

[21] Appl. No.: 24,605

[22] Filed: Mar. 28, 1979

[51] Int. Cl.³ .............................................. H02K 33/00
[52] U.S. Cl. ........................................ 310/27; 310/15
[58] Field of Search ...................... 310/18, 13, 27, 25

[56] References Cited

U.S. PATENT DOCUMENTS

| | | | |
|---|---|---|---|
| 2,409,857 | 10/1946 | Hines et al. | 310/15 |
| 2,739,249 | 3/1956 | O'Gorman et al. | 310/15 |
| 2,740,946 | 4/1956 | Geneslay et al. | 340/17 |
| 2,820,915 | 1/1958 | Mathews | 310/168 |
| 2,832,903 | 4/1958 | Carter | 310/27 |
| 2,842,688 | 7/1958 | Martin | 310/15 |
| 2,959,747 | 11/1960 | Challacombe et al. | 310/156 |
| 3,024,374 | 3/1962 | Stauder | 310/15 |
| 3,067,404 | 12/1962 | Hildebrandt | 340/17 |
| 3,133,214 | 5/1964 | Lawson et al. | 310/15 |
| 3,353,131 | 11/1967 | Stubbs et al. | 336/130 |
| 3,470,399 | 9/1969 | Johnson et al. | 310/27 X |
| 3,733,592 | 5/1973 | Applequist et al. | 340/174.1 C |
| 3,816,777 | 6/1974 | Metzgar et al. | 310/13 |
| 3,943,443 | 3/1970 | Kimura et al. | 310/15 X |
| 4,055,849 | 10/1977 | Hickok | 360/77 |

*Primary Examiner*—Donovan F. Duggan
*Attorney, Agent, or Firm*—Cesari & McKenna

[57] ABSTRACT

A velocity transducer for converting linear mechanical motion to an electrical signal. A stationary permanent magnet is supported within and spaced from an iron pole piece assembly which forms a closed path around the magnet. The pole piece assembly has a pair of linear pole piece segments which extend in parallel on opposite sides of the magnet, spaced apart from the north and south pole faces of the magnet, respectively. A moveable (i.e. slideable) coil is wound around each such linear pole piece. The two coils are series-connected and oppositely wound with respect to the flux produced by the magnet. Noise signals induced in the coils subtract from each other and substantially cancel, but motion-related signals add.

2 Claims, 5 Drawing Figures

DIFFERENTIAL LINEAR VELOCITY TRANSDUCER

FIELD OF THE INVENTION

This invention relates to the field of velocity transducers and, in particular, to an improved rate detector or velocity transducer for converting linear mechanical motion to an electrical signal, being particularly adapted to recording head positioners used in magnetic disk recording systems.

BACKGROUND OF THE INVENTION

Magnetic disk recording systems for storing digital data incorporate magnetic recording and playback heads which must be accurately positioned over tracks on the disk whereon data has been recorded or is to be recorded. These heads must be rapidly moved (generally along a radial line) from one position to another, responsive to control signals, so that data can be read from and written at appropriate locations on a disk. Typically, linear electromechanical positioning mechanisms are employed for effecting the required head motion. A closed loop servo system is used to control the positioning mechanism; and this servo frequently requires a velocity sensing transducer, for detecting, controlling and stabilizing head motion.

Typical prior art velocity tranducers or rate of motion detectors employ a moving magnet which induces a voltage in a long, stationary coil. The induced voltage is proportional to the velocity of the moving magnet and this, in turn, is directly related to the velocity of the head. These transducers, however are relatively long—more than twice as long as their rated sensing distance. In addition, their sensitivity to external noise fields is frequently objectionably high.

A general, diagrammatic illustration of a typical magnetic disk recording system (in which the present invention would see application) is provided in FIG. 1. As illustrated therein, a magnetic disk recording medium 12 is rotated at a high rate of speed by a drive motor 14 on a spindle 16 turned by the drive motor. A magnetic recording head 18 is used to record (i.e., write) signals on and read signals from the disk 12. Head 18 typically floats upon a cushion of air set up by the rapid rotation of the disk. A servo-mechanism 22, responsive to position signals provided on line 24, controls the motion of head 18 through an electromechanical 26 including a head positioning link 28. By action on link 28, the servomechanism reciprocates the head 18 in the radial direction indicated in the figure by the letter X and a double-ended arrow 29, in order to position the head at a desired one of many concentric tracks on the disk.

A velocity sensor or transducer 30 is also connected to linkage 28. This sensor generates an electrical output signal responsive to the motion of linkage 28 and, consequently, head 18. The output signal from velocity transducer 30 is fed back to the servo control 22; the servo computes and generates any required correction signals to drive the head 18 toward the commanded position, if it is to counteract any motion or deviation away therefrom.

FIG. 2 shows one basic alternative arrangement for a prior art velocity transducer which, by contrast to the moving magnet rate detector, employs a moving coil 32 and fixed magnet 34. The magnet 34 is attached between a pair of iron pole pieces 36 and 38 which extend longitudinally, in parallel, in the X (i.e., radial) direction. The magnetic flux between the north pole N and the south pole S of the magnet 34 is concentrated by the pole pieces 36 and 38 across the air gap 40 which exists between the pole pieces. The arrows 42 between the pole pieces 36 and 38 indicate the magnetic field in the region 40. The coil 32 is mechanically connected to the linkage 28 by conventional means, not shown in order to preserve the clarity of the illustration. Thus, the linkage 26 moves the coil 32 along the pole piece 36 in the X direction. As a result of the motion of the coil 32, a voltage E appears across its terminals 44 and 46.

The induced voltage E is given by the following relationship:

$$E \ (d\Phi/dt) = (d\Phi/dx) \cdot (dx/dt) = (d\Phi/dx) \cdot v$$

where $\Phi$ represents the magnetic flux and v represents linear velocity in the X direction. Thus, for a constant magnetic flux density B in the air gap 40, a constant change in flux would be realized and the transducer would produce a signal proportional to the velocity.

While the sensor of FIG. 2 is shorter in length and less expensive to fabricate then a moving magnet transducer with a stationary coil, it nevertheless has significant drawbacks. First, the magnetic flux density B cannot be made sufficiently constant in the air gap to achieve the head positioning accuracy and stability often desired in current disk system technology. Second, the iron pole pieces saturate near the section 48 and reduce the amount of flux that bridges the air gap, also thereby reducing the sensitivity of the detector. Third, the detector is quite sensitive to radiation from external alternating electromagnetic sources such as the voice coil (i.e., positioner) which is commonly employed in the electromechanical actuator 26 to drive the linkage 28.

An improvement in sensitivity is accomplished with the design shown in FIG. 3, by the use of a different magnetic flux path. In that structure, magnet 52 produces flux spanning the total range of travel of the moving coil 54 and pole pieces 56 and 58 provide a closed path for returning the flux around the ends of the magnet. Assuming that the iron path pieces 56 and 58 are of like cross-sectional area and configuration as pole pieces 36 and 38, this tachometer has typically twice the output per unit velocity as compared with the design shown in FIG. 2. Further, as the iron pieces 56 and 58 are driven into (plus and minus) saturation in the end regions 62 snd 64, respectively, a reduction in noise sensitivity is also achieved.

SUMMARY OF THE INVENTION

The present invention improves upon the apparatus of FIG. 3, to decrease sensitivity to noise pick-up and increase sensitivity to motion. These characteristics are achieved by using a connected pair of moving coils instead of just one coil. A stationary permanent magnet is "suspended" or supported within, and spaced from, a closed path iron pole piece assembly. The two coils are slidable in tandem, along opposite pole pieces of this assembly. The coils are connected in series and oppositely wound with respect to the flux produced by the magnet, so that the voltage across the series-connected coil pair has both common mode and differential mode components. Due to this arrangement, external noise fields induce essentially equal and opposite polarity signals in the coils; these "common mode" signals tend to cancel and as a result, a much diminished noise voltage appears at the terminals of the coil pair. At the same time, the voltages induced in the two coils by motion (relative to the magnet) are additive, since the coils are both oppositely wound with respect to the magnetic flux lines they cut across and move in opposite directions relative thereto. These motion voltages add together to produce a "differential mode" output.

These and other features of the present invention will be more fully understood by reference to the following detailed description and the accompanying drawings. The invention is pointed out with particularity in the appended claims.

DESCRIPTION OF AN ILLUSTRATIVE EMBODIMENT

Figure 4:
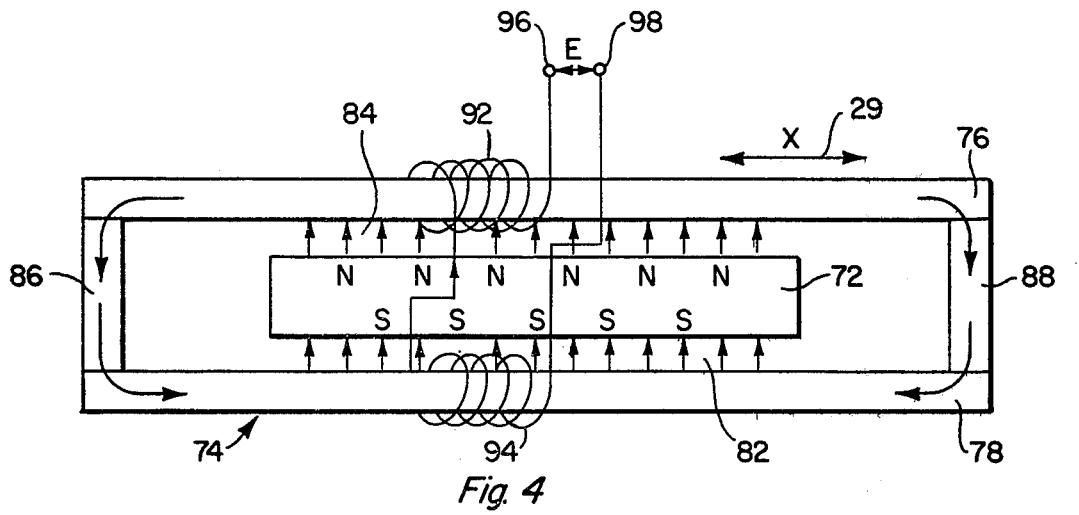
FIG. 4 is a side view diagrammatically illustrating the differential linear velocity transducer of the present invention.
Figure 5:
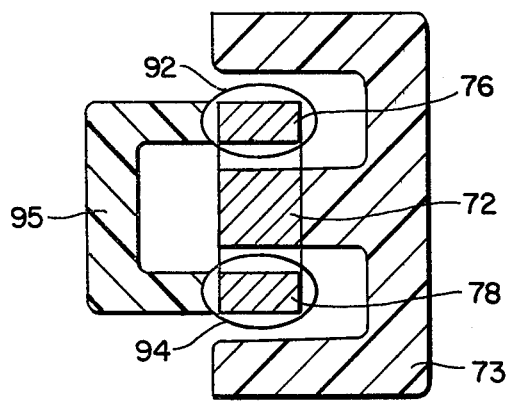
FIG. 5 is a representative sectional view of the transducer of FIG. 4, with magnet-supporting case and coil-supporting bracket added.

The differential linear velocity transducer of the present invention is shown in FIGS. 4 and 5, to which reference is now made.

Figure 3:
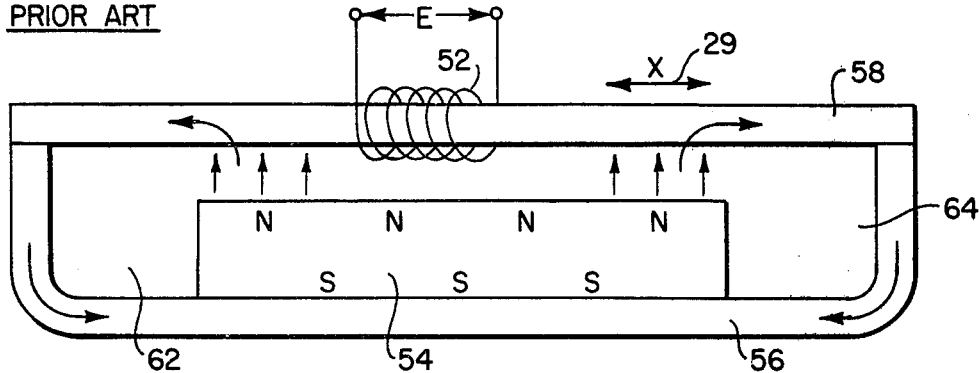
FIG. 3 is a diagrammatic illustration of another type of prior art moving coil velocity transducer.

As indicated in the schematic drawing of FIG. 4, the differential sensor of the present invention is closely related to the prior art design of FIG. 3. Instead of one air gap and one coil, however, the magnet produces a magnetic field in two air gaps, one on either side of the permanent magnet, and thereby symmetrically accommodates two coils.

A permanent magnet 72, of generally elongate configuration, is supported by a non-magnetic case 73 (shown in FIG. 5), inside a closed path iron pole piece assembly 74. The iron pole piece assembly comprises a pair of elongate pole pieces 76 and 78 symmetrically disposed in parallel on each side of the permanent magnet. Each of the pole pieces 76 and 78 is spaced apart from the (north or south pole) surface of the magnet by an air gap 82 or 84, respectively. The two ends of the pieces 76 and 78 are closed and jointed together by a second pair of iron pieces 86 and 88, so that together the iron pieces 76, 78, 86 and 88 provide a closed path for the flux of the magnetic field set up by the permanent magnet 72.

The pole pieces 76 and 78 are made of iron and configured as elongate elements having, e.g., a rectangular or circular cross-sectional shape. Coils 92 and 94 are wound around each of the elongate pole pieces 76 and 78, repectively, for sliding motion thereon. These coils may, for example, be wound on coil forms which are slidable on the pole pieces. Both coils are attached to a common (non-magnetic) bracket 95 (see FIG. 5) so that they may be moved in tandem in the X direction; this bracket 95 is, in turn, connected to the linkage 26 in a conventional manner, not indicated in the drawings.

Coils 92 and 94 are physically wound in the same direction as viewed from their ends, thereby being wound in opposite directions relative to the flux produced by magnet 72. One end of coil 92 is connected to the facing end of coil 94—that is, the end of coil 94 which is disposed toward the same end piece 86 or 88 as the aforementioned end of coil 92. The output of the transducer appears across the two other ends of the coils, as a voltage E at terminals 96 and 98. Thus, coils 92 and 94 are connected in series.

When the coils 92 and 94 move at a linear velocity on pole pieces 76 and 78, the voltages produced in the two coils add and produce a "differential mode" component to the voltage E. Noise pick-up will provide another component to voltage E. An external magnetic field, such as a noise field, will produce a magnetic alternating induction in pole pieces 76 and 78 of equal magnitude and sign; the resulting noise voltages induced in coils 92 and 94 will be of substantially equal magnitude but opposite sign, due to the "opposite" directions of the windings. These noise voltage components will therefore tend to cancel each other, producing common mode rejection of the unwanted signal component.

Figure 1:
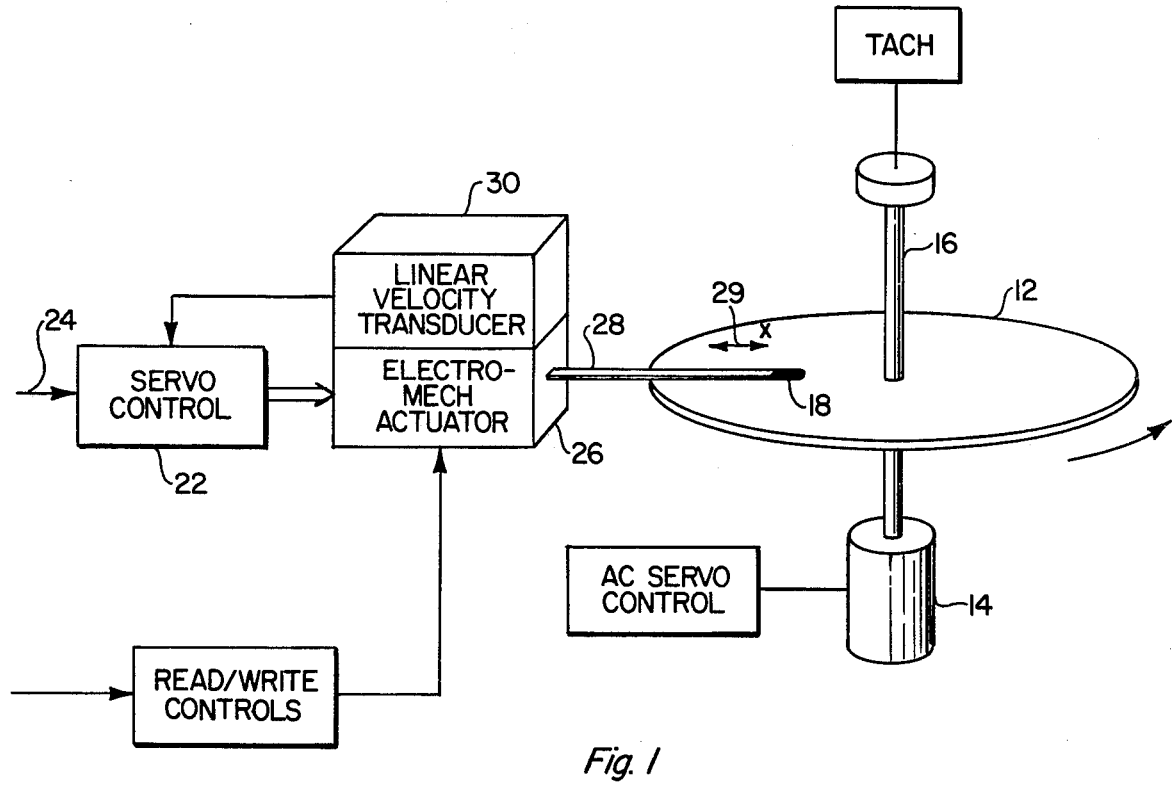
FIG. 1 is a combined diagrammatic illustration and block diagram of a typical disk drive unit in which a linear velocity transducer according the present invention could be utilized.
Figure 2:
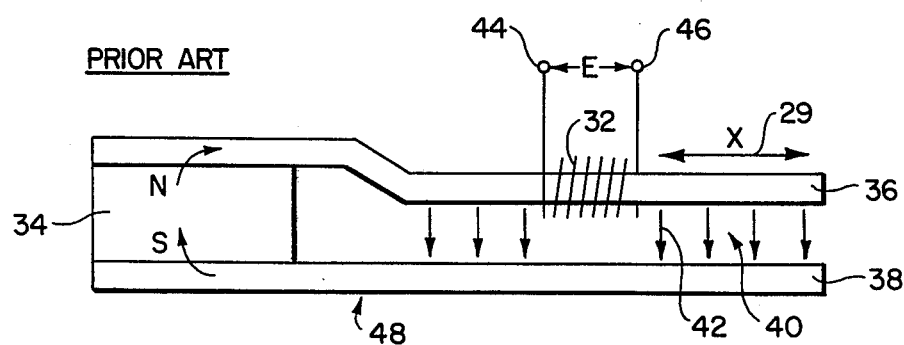
FIG. 2 is a diagrammatic illustration of one type of prior art moving coil velocity transducer.

A differential velocity transducer according to the present invention has been built and tested in comparison with a transducer of the FIG. 2 design. Both were designed to yield approximately the same sensitivity per coil. In both cases, the magnet was made of the same material, Ferrimag 5, a ceramic magnetic material. The pole pieces were of round cross-section, although they might just as well have been of rectangular or other shape without producing substantially different results.

The sensitivity of the two transducers was measured by mechanically connecting each, in turn, to an appropriate driving linkage. The linkage was commanded to produce a square wave motion and the voltage E at the coil terminals was compared for the two cases. The differential velocity transducer of the present invention was found to have an output of 87 mV/ips as compared with 42 mV/ips for the FIG. 2 transducer. Thus, the sensitivity was slightly more than doubled.

Sensitivity to noise pick-up was also measured. A two hundred turn coil of rectangular cross-section four inches by 2.5 inches was used as a source of electromagnetic noise. A square wave current of $+/-$ one amp peak and approximately 0.5 ms rise time was driven through the coil. This noise source coil was placed symmetrically with respect to the two coils of the differential transducer, near one end thereof, so that the longitudinal axis of symmetry of the transducer was made to coincide with one of the main symmetry planes of the noise emitting coil. The voltage E across the terminals 96 and 98 was measured with the coil pair located at various positions along the pole pieces. When the coils were, in both cases, at the middle of their ranges of travel, the differential coil pair of the present invention provided only 10 mV of "noise" pick-up as compared with 500 mV for the FIG. 2 design. Since the present invention, as indicated above, has approximately twice the velocity sensitivity, an effective improvement of signal-to-noise ratio by a factor of one hundred was demonstrated by this test.

An additional noise susceptibility test with performed by operating an electric hand drill rated at 1/5 hp, 3.5 amp maximum, approximately six inches away from the transducer. The drill was positioned such that noise pick-up from the 60 Hz motor field was maximized in each case. In this situation, the differential transducer of the present invention produced about 45 mV of noise pick-up at its output, while the FIG. 2 design produced 130 mV. Thus, the present invention yielded a six times better signal-to-noise ratio in that particular test, with the noise source oriented in some imprecise asymmetric fashion with respect to the transducer.

These results demonstrate, at least qualitatively, the combination of increased signal sensitivity and decreased noise sensitivity of the present invention as compared with more conventionally designed moving coil transducers.

It will be readily understood by those skilled in the art that various alterations, improvements and modifications may be made with respect to the illustrated embodiment without departing from the teaching thereof. It is therefore intended that all such alterations, modifications and improvements are within the spirit and scope of this invention. Accordingly, the invention is limited only as defined in the following claims.

What is claimed as new and desired to be secured by Letters Patent of the United States is:

1. A linear velocity transducer for converting mechanical motion to an electrical signal, comprising, in combination:
   a permanent magnet;
   a pole piece assembly of magnetic material;
   the pole piece assembly comprising:
   (a) a first pole piece of magnetic material disposed opposite the north pole of the magnet and spaced apart therefrom;
   (b) a second pole piece of magnetic material disposed opposite the south pole of the magnet and spaced apart therefrom;
   (c) a third pole piece of magnetic material connecting the first and second pole pieces, and
   (d) a fourth pole piece of magnetic material connecting the first and second pole pieces, whereby the pole piece assembly provides a closed path for flux generated by the magnet and surrounds in part the magnet;
   (e) a first coil wound around and slideable along the first pole piece;
   (f) a second coil wound around and slideable along the second pole piece;
   (g) the first and second coils being connected in series and oppositely wound with respect to the flux generated by the magnet, the output voltage of the transducer being the voltage produced across such series-connected coils.

2. The linear velocity transducer of claim 1, further including: common bracket means for physically connecting and supporting the first and second coils, such bracket means being adapted to slide such coils in tandem along the pole pieces, whereby the coils produce additive electrical signals responsive to such sliding motion and subtractive electrical signals due to noise pick-up.

* * * * *